RECIRCULATING DATA STORAGE SYSTEM

Filed Oct. 31, 1966 5 Sheets-Sheet 1

INVENTOR: ALFRED CUTAIA

BY Richard H. Smith

ATTORNEY

RECIRCULATING DATA STORAGE SYSTEM

Filed Oct. 31, 1966 5 Sheets-Sheet 1

United States Patent Office 3,508,204

Patented Apr. 21, 1970

3,508,204

RECIRCULATING DATA STORAGE SYSTEM

Alfred Cutaia, Rochester, Minn., assignor to International Business Machines Corporation, Armonk, N.Y., a corporation of New York Filed Oct. 31, 1966, Ser. No. 590,958
Int. Cl. G11c *21/00*
U.S. Cl. 340—172.5 5 Claims

ABSTRACT OF THE DISCLOSURE

A recirculating data storage system which includes serial data storage means, such as a delay line, having an input and an output; first and second data feedback loops connecting the input and output; the first data feedback loop including data processing logic circuits and the second feedback loop being exclusive of these logic circuits; gating means for sequentially directing a first set of data units presented to said output into the first loop and for directing a second set of data units, interspersed among the first set, into the second loop; and control means for selectively reversing the operation of the gating means whereby the first set of data units is directed into the second loop and the second set of data units is directed into the first loop.

This invention relates to recirculating data storage systems and, more particularly, to a recirculating delay line data storage system wherein the full storage capacity of the delay line is utilized, notwithstanding the fact that the data rate of the processing circuits associated with the storage system is below that required for maximum storage utilization.

Recirculating storage systems such as those commonly employing delay lines are generally recognized as being least expensive on a cost per bit basis when used in connection with relatively low storage capacity devices such as accumulation systems for desk calculators, cash registers, or the like. Low speed serial calculating circuits are generally employed with these systems in order to keep hardware costs to a minimum. However, when the delay line, which is a high-speed device, is operated at the bit rate of the calculator, a great deal of storage capacity of the delay line is wasted. For example, at a calculation bit rate of 100 Kc., bits are spaced at 10 microsecond intervals in the delay line. Since most delay lines are capable of operation in the megacycle range, bits can be spaced at intervals of 1 microsecond or less. At the lower bit rate, therefore, 90 percent or more of the storage capacity of the delay line is not utilized.

It is therefore an object of the present invention to provide an improved recirculating data storage system that operates at a bit rate exceeding that of the data processing circuits with which it is associated.

Another object is to provide a recirculating delay line storage system, the full storage capacity of which can be utilized nowithstanding the fact that the data processing circuits associated with it operate at a lower bit rate than the maximum bit rate of the delay line.

In accordance with the principles of the present invention, a multiple loop recirculating delay line storage system is provided. The data processing circuit for operating upon the stored data is connected in one of the loops. Stored data is recirculated in all of the loops simultaneously, the data being interleaved, or "multiplexed," as it passes through the single delay line. Means are provided for selectively calling the data of any one loop into the processing loop and at the same time channeling the data from the processing loop into the called loop. By this means the data circulating in any loop of the system can be directed into the processing loop, thereby allowing the processing circuits access to all data stored in the system.

The foregoing and other objects, features and advantages of the invention will be apparent from the following more particular description of a preferred embodiment of the invention, as illustrated in the accompanying drawings.

Figure 4:
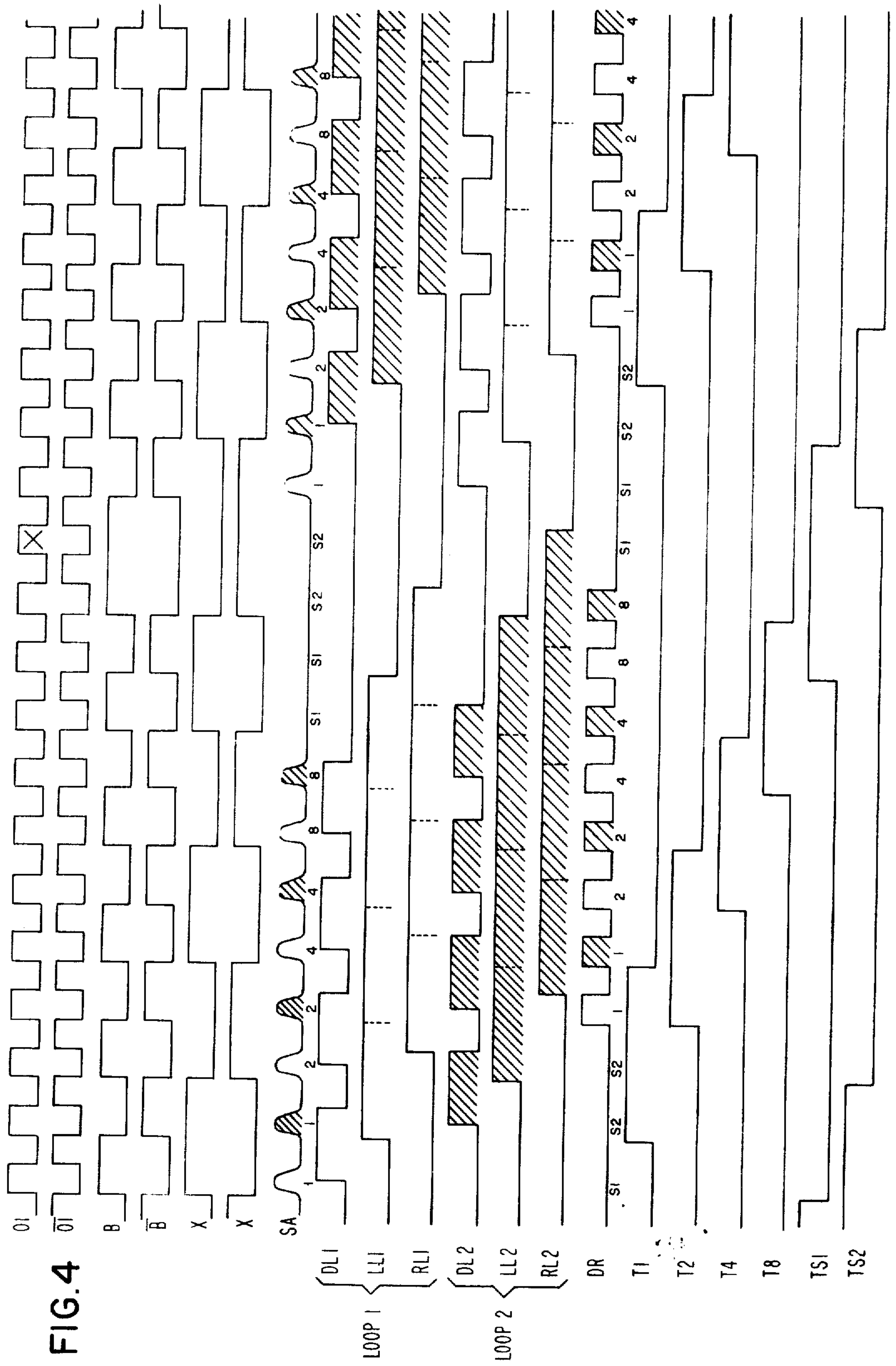

FIG. 4 is a timing diagram illustrating the "shift right" mode of operation of the system wherein the shaded data bits are transferred from loop 2 to loop 1 and the non-shaded data bits are simultaneously transferred from loop 1 to loop 2.

Figure 5:
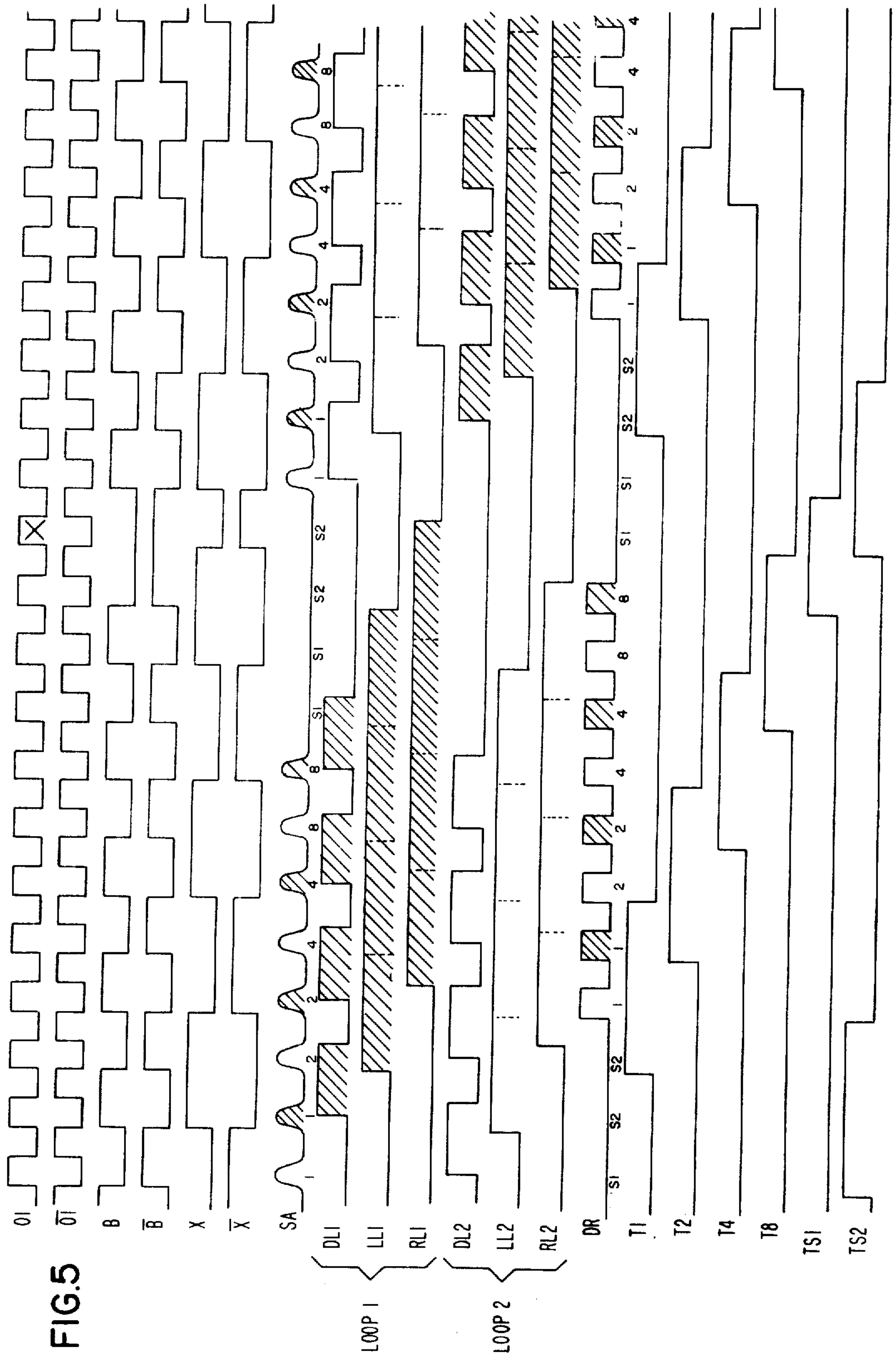

FIG. 5 is a timing diagram illustrating the "shift left" mode of operation of the system wherein the shaded data bits recirculating in loop 1 are transferred back to loop 2 and the non-shaded bits recirculating in loop 2 are simultaneously transferred back to loop 1.

Figure 1:
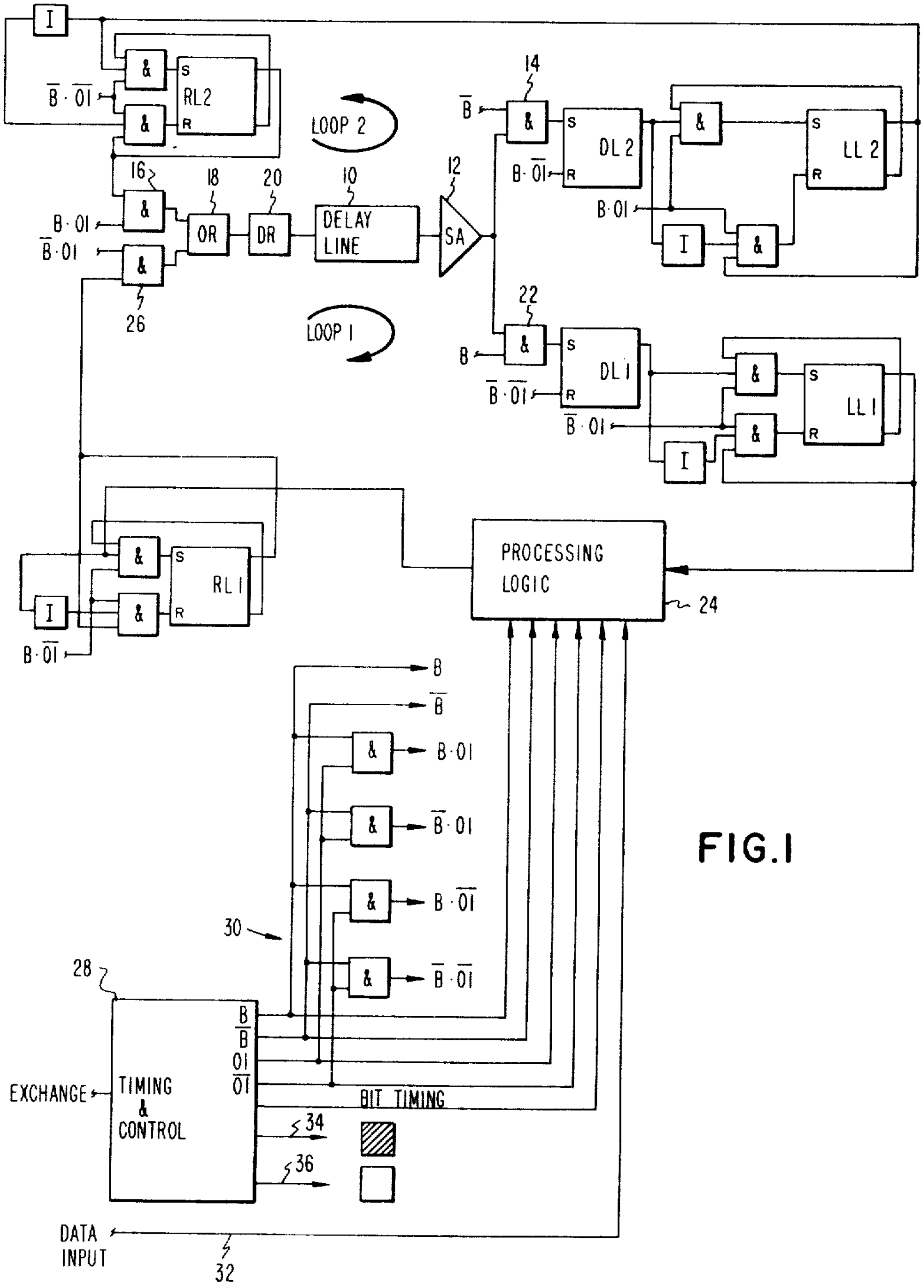
FIG. 1 is a schematic circuit diagram illustrating a two loop embodiment of the storage system of the invention.

Referring to FIG. 1, the system of the invention is hereinafter described in detail. A delay line 10 of, for example, the piezo-Wiedemann or magnetostrictive type, has a sense amplifier 12 connected to its output for detecting and shaping data pulses. Data is loaded onto the delay line by a driver circuit 20 which is fed by an OR circuit 18. Data feedback loop 1 includes an AND gate 22 which is connected to sample the output from amplifier 12. AND 22 is energized each B time of the timing cycle (illustrated in FIG. 3 and described in detail subsequentially). The output from AND 22 is fed to the input of a bistable latch circuit DL1. The output of latch DL1 in turn is fed to the input of latch circuit LL1. The output of latch LL1 is transmitted to data processing logic circuits 24. The latter circuits may be, for example, a serial full adder-subtractor or any other circuit for serially performing arithmetic or other operations on the data fed to it from latch LL1 and from a data input line 32. The output from logic circuits 24 is fed to the input of a latch circuit RL1. The data stored in latch RL1 is transmitted back to delay line 10 through an AND circuit 26, OR circuit 18 and driver 20. Since it contains the circuits 24, loop 1 is the processing loop.

All bistable latch circuits employed in the system are of conventional design wherein a positive input signal at the set (S) input causes the set output to go positive and the reset output to go negative. Conversely, a positive input signal at the reset (R) input causes the reset output to go positive and the set output to go negative. A set input has no effect if the set output is already positive and a reset input similarly has no effect if the reset output is already positive.

Data recirculation loop 2 includes AND gate 14, latch DL2, latch LL2, latch RL2 and AND gate 16. As will become apparent during the subsequent description of the operation of the system, the data circulating in loop 1 is time-division multiplexed or interleaved in delay line 10 with the data circulating in loop 2. A timing and control circuit 28 provides all timing and control signals necessary to move the data through the two circulation loops and to exchange the data in the loops in response to an EXCHANGE input signal. The timing signals generated by circuit 28 are also supplied to the data processing logic 24 where they are necessary for supervision of the data processing operation. In addition, circuit 28 generates bit timing signals which are supplied to the circuits 24 to identify the recirculating data bits. Mutually exclusive signals are generated on lines 34 and 36 to signify which set of data is being circulated in the processing loop 1.

Figure 2:
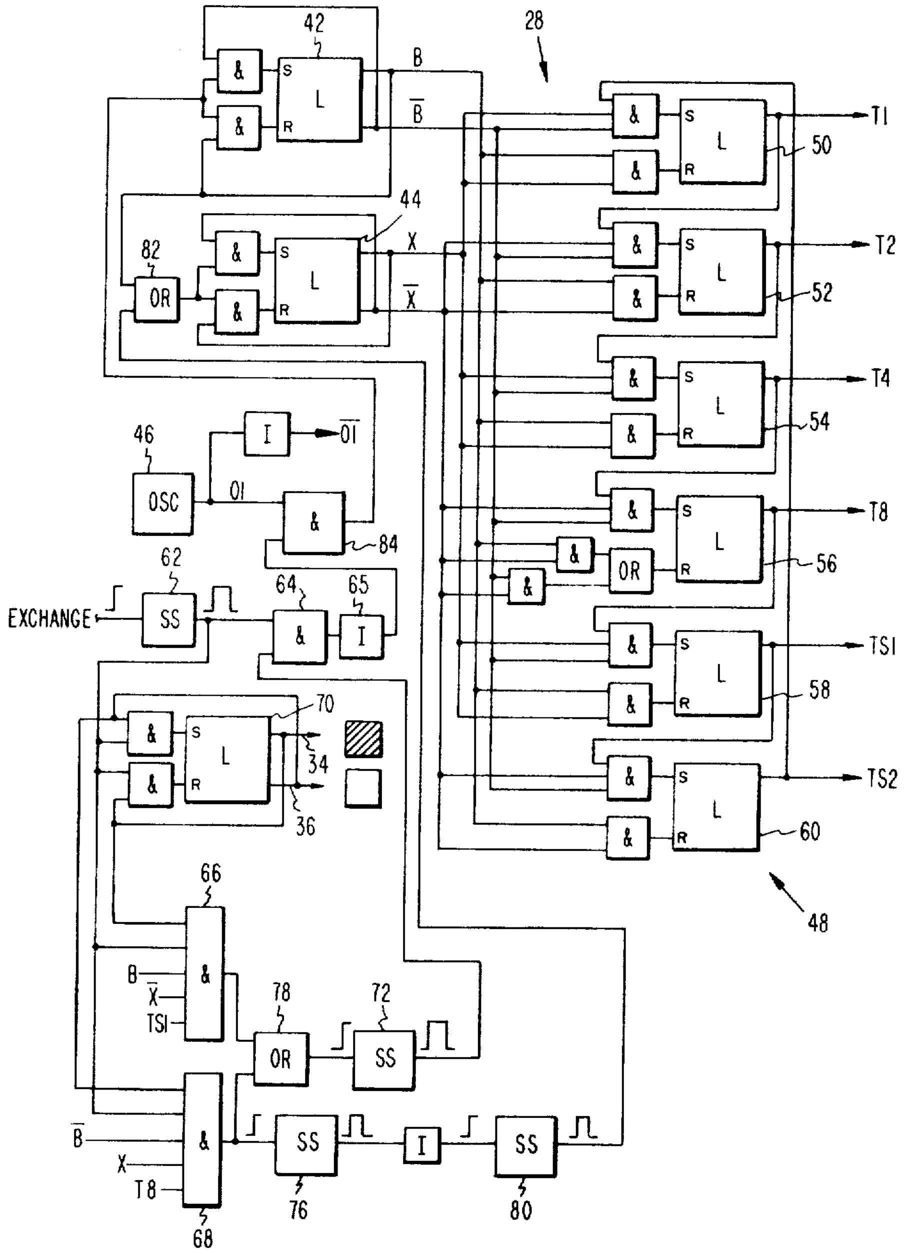
FIG. 2 is a schematic circuit diagram of the timing and control circuit of FIG. 1.

FIG. 2 shows the circuit details of timing and control circuit 28. A constant frequency square wave oscillator 46 generates the basic timing signals 01 (FIG. 3) utilized in the system. A latch circuit 42 operating in response to 01 signals produces a pair of inverse timing signals B and $\overline{B}$. A latch circuit 44 operates in response to the B signal to produce a second set of timing signals X and $\overline{X}$. The four signals B, $\overline{B}$, X and $\overline{X}$ are fed to a six-position timing ring 48.

The ring 48 comprises six latch circuits 50, 52, 54, 56, 58 and 60 which produce the six basic data bit identification signals T1, T2, T4, T8, TS1 and TS2 employed in the system. One complete cycle of ring 48 may, for example, represent one data character wherein the T1, T2, T4, and T8 signals represent 1, 2, 4 and 8 weighted binary bits coded in accordance with the binary-coded-decimal notation. TS1 and TS2 signals represent space bits which are used for timing purposes and do not contain substantive data. These space bits are necessary to enable exchange of data between the two loops, as described subsequently. The space bits may also be required for operation of the processing circuits 24.

A singleshot multivibrator 62 is provided to trigger the circuits which operate in response to an EXCHANGE command to exchange the data in loop 1 for that in loop 2 and vice-versa. The two exchange operations are herein called "shift right" and "shift left" operations and are explained in detail subsequently. Basically, a shift right operation is executed when AND 66 triggers a singleshot 72 in response to an output from singleshot 62 together with coincidence of the B, $\overline{X}$, and TS1 timing signals. This operation is utilized to exchange the data when the shaded data set is circulating in loop 2. A shift left operation is executed when AND 68 triggers singleshot 72 in response to an output from singleshot 62 together with coincidence of the $\overline{B}$, X and T8 timing signals. This operation is utilized to exchange the data when the non-shaded data set is circulating in loop 2. Latch circuit 70 provides signals on output lines 34 and 36 which indicate which set of data are circulating in the two loops.

Operation—normal condition

Figure 3:
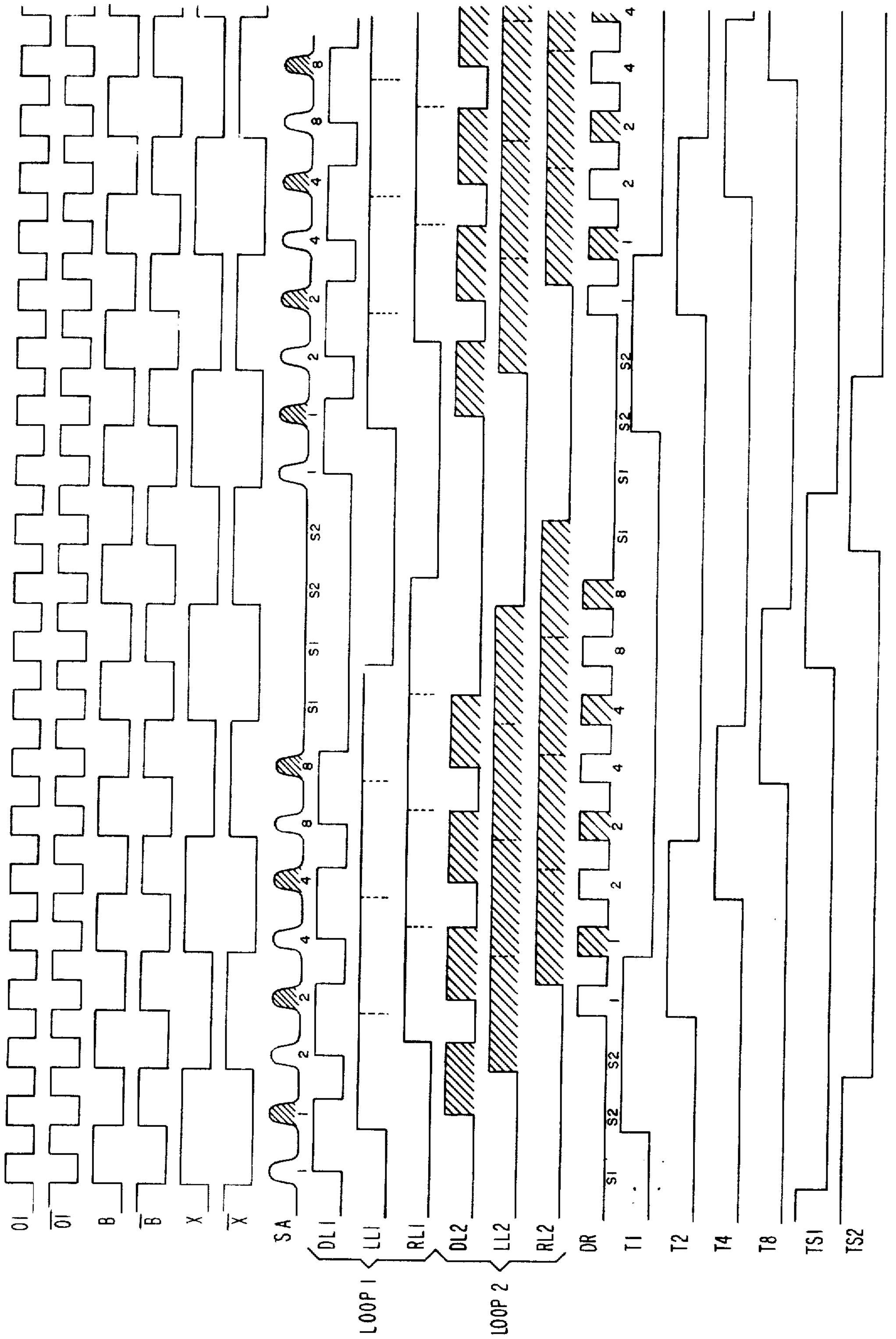
FIG. 3 is a timing diagram illustrating a mode of operation of the system wherein the shaded data bit signals are recirculated in loop 2 and the non-shaded data bit signals are recirculated in loop 1.

With reference to FIGS. 1, 2 and 3, the normal operation of the system in the invention is hereinafter described. By "normal operation" it is mean that the data recirculating in loop 1 continues to recirculate in that loop and the data recirculating in loop 2 continues to recirculate through that loop. In the timing diagram of FIG. 3, the SA, DL1, LL1, RL1, DL2, LL2, RL2 and DR signals emanate from the outputs of the components in FIG. 1 having the same reference letters. The SA signal occurring at the output of amplifier 12 contains the data bits emerging from delay line 10. Alternate bit signals have been shaded to identify that portion of the signal which is recirculating in loop 2. This fact is further indicated by the shading applied to the output signals generated by the loop 2 components, latch DL2, latch LL2 and latch RL2. Also, shading is used on the DR signals to indicate the various signals fed back into the delay line from loop 1 (non-shaded) and from loop 2 (shaded). For purposes of simplification, the data characters illustrated in the diagrams are characters made up of all "1" bits (with the exception of the space bits which never contain 1 bits) and no alteration is performed by the processing circuits 24 on the data recirculating in loop 1.

The first "1" bit appearing in output signals SA occurs when B is positive whereupon AND 22 transmits a positive signal to the input of latch DL1 causing the output thereof to go positive. The positive output from latch DL1 causes latch LL1 to be set upon the coincidence (meaning both are positive) of $\overline{B}$ and 01. The coincidence of the latter two signals is indicated by the signal denoted $\overline{B}\cdot 01$ which occurs at the output of one of the four AND circuits 30. The output of latch LL1 is fed to the processing logic circuits 24 and the coincidence of a positive signal at the output of LL1 with bit timing signal T1 indicates to the circuits 24 that the low digit-order bit of the data character has a binary value of 1. The output of latch LL1 stays up for a full two cycles of signal 01, allowing the circuits 24 that period of time in which to operate on the data bit. At $B\cdot\overline{01}$ time latch RL1 samples the output from the logic circuits 24 and stores the value of the data bit appearing thereat. The following $\overline{B}\cdot 01$ time AND 26 samples the output of latch RL1 and presents a bit pulse representative of the binary value of the output signal to delay line driver 20 through OR 18. Thus, by comparing the displacement of the first SA signal of FIG. 3 and the first DR signal, the "feedback" delay in recirculating a data bit from the output of delay line 10 back to the input thereof may be determined. As shown, this delay period is three cycles of 01. The ensuing 2, 4 and 8 non-shaded data bits of the character are gated by AND 22 into loop 1 in a manner identical to that just described for the first bit.

Since AND gate 14 is energized during the positive portions of the $\overline{B}$ signal, AND 14 detects the alternate (shaded) data bits appearing in output signal SA. These bits are channelled into and recirculated through loop 2 in exactly the same manner as they are recirculated through loop 1. The operation of the loop 2 components, however, is displaced by half a cycle of B from the operation of the corresponding loop 1 components. As shown in FIG. 3, the output signals from loop 2 components DL2, LL2 and RL2 are shaded to indicate that they respond to the shaded data bit signals in SA. It is to be noted that when the data bits are fed back into the delay line (signal DR) they appear in the same order that they emerged therefrom (signal SA). The interleaving is always the same, i.e., non-shaded bit preceeding shaded bit. It is highly beneficial, as will become apparent, that this interleaving sequence always remain the same, no matter which loops the two sets of data happen to be in.

The reference for the bit timing signals T1, T2, T4, T8, TS1 and TS2 is taken at the output of latch LL1. Thus, as shown in FIG. 3, signal T1 goes positive at the time latch LL1 goes positive in response to the "1" bit of the data signal. Similarly, signals T2, T4 and T8 go positive at the time latch LL1 responds to the "2," "4" and "8" bits of the data signal. Since in the example illustrated in FIG. 3 all data bits are valued at the binary 1 level, latch LL1 goes positive and stays positive for the duration of all four signals T1–T8. However, dashed dividing lines are used in the LL1 signal to indicate the point in time that signal would go negative in response to any data signal having a value of binary 0. The same symbology is used with the RL1, LL2 and RL2 signals.

Operation—shift right

The shift right mode of operation is illustrated in FIG. 4. Prior to a shift right operation the shaded data bits are recirculating in loop 2 and the non-shaded bits in loop 1 in accordance with the normal mode of operation just described. The shift right operation reverses this state, i.e. the shaded bits are transferred to loop 1 and the non-shaded bits to loop 2.

The shift right operation is accomplished by shifting the timing signals at a time when no data is contained in either of the two loops. By "no data" it is meant that only space bits S1 and S2 are at that particular time being handled by the feedback loop circuits. Shifting of the timing signals is initiated by an EXCHANGE input signal to timing circuit 28. This signal triggers singleshot multivibrator circuit 62 which produces a positive output signal having a duration slightly in excess of one complete cycle of timing ring 48. The output from singleshot 62 partially conditions AND circuits 64, 66 and 68 and switches the state of latch circuit 70. The mutually exclusive output signals present on lines 34 and 36 from latch 70 indicate which of the two feedback loops the data sets are in at any given time. Thus, when output line 34 is positive the shaded data set is in loop 1 and the non-shaded set is in loop 2. The opposite is true when output line 36 is positive. Thus, in effecting a shift right operation, the output from singleshot 62 switches line 34 to a positive condition. This generates a second conditioning input to AND 66.

As soon as the signals B, $\overline{X}$ and TS1 coincide in a positive state, AND 66 generates a positive output signal which triggers singleshot 72 through OR 78. The output from singleshot 72 has a duration which is slightly in excess of one and a half 01 cycles. This signal which is fed to the input of AND 64 causes the output of that AND circuit to go positive and thus causes inverter 65 to present a negative signal to the input of AND 84. This inhibits AND 84 for a duration sufficient to prevent the gating of the 01 signal marked by an X in FIG. 4 to the input of latch 42. This momentarily freezes the condition of the B and $\overline{B}$ signals and causes them effectively to shift right one half a cycle as indicated in FIG. 4. This causes latch 44 to be temporarily inhibited so that the current half-cycles of the X and $\overline{X}$ signals are stretched by one half a B cycle.

After the output from single 72 times out and AND 84 once again transmits 01 pulses to latch 42, the B, $\overline{B}$, X and $\overline{X}$ signals resume their occurrence in the same sequence as before. However, this shift in the timing signals causes AND gate 14 to be energized when the first (non-shaded) data bit of the next character emerges from the delay line. This bit is therefore gated into loop 2. The first shaded data loop is gated by AND 22 into loop 1. Since after the timing shift the alternating operation of AND's 14 and 22 continues as previously described the effect is to channel the shaded data bits into loop 1 and the non-shaded bits into loop 2, which is the reverse of the condition previous to the right shift operation. It is important to note, however, that when the data bits are regenerated onto the delay line through driver 20, they appear in exactly the same order as before. As far as the delay line is concerned, no change whatsoever has occured in the mode of data recirculation. As long as no further EXCHANGE signal is presented to timing circuit 28, the shaded data bits will continue to recirculate in loop 1 and the non-shaded data bits in loop 2. Because of this there is no possible way of intermixing the shaded data characters with the non-shaded characters. Complete isolation of the two data sets is maintained no matter how frequently shift right and shift left operations are performed.

Note also in FIG. 4 that the bit timing signals shift to compensate for the shift right operation. Thus the TS1 signal occurring at the time of the shift right operation is stretched by half a B cycle, causing the next T1 signal and all bit signals thereafter to occur at the proper time with reference to the LL1 output.

Operation—shift left

In the shift left operation the shaded data bits circulating in loop 1 are transferred back to loop 2 and the non-shaped loop bits which are circulating in loop 2 are transferred back to loop 1. The operation is shown in FIG. 5. It is triggered by the occurrence of an EXCHANGE signal at a time when output line 34 of latch 70 is positive. The EXCHANGE signal triggers singleshot 62 to produce an output signal which partially conditions AND's 64, 66 and 68 and which switches the state of latch 70 so that output line 36 thereof goes positive. The resultant negative signal on line 34 deconditions AND 66. As soon as there is coincidence of the signals $\overline{B}$, X and T8 AND 68 generates a positive output signal which triggers singleshot 72 through OR 78 and which further triggers a singleshot 76. The output from singleshot 72 energizes AND 64 in exactly the same manner as previously described for the shift right operation whereby AND 84 is deconditioned for a period of time sufficient to prevent the transmission of the 01 pulse marked with an X in FIG. 5 to the input of latch 42. This temporarily inhibits the operation of the latch and freezes the condition of the B signal for one half a cycle. Also, when singleshot 76 times out, singleshot 80 generates a positive signal which is fed through OR 82 to the input of latch 44. This switches the state of the X signal and prevents it from being stretched by the half-cycle delay of the B signal. After singleshot 72 times out AND 84 is once again conditioned to pass 01 pulses and the B and X signals resume their operation as before. However, due to the effect of the one-half B cycle shift left operation, the first data bit (non-shaded) occurring in output signal SA is gated by AND 22 into loop 1 and the first shaded data bit is gated by AND 14 into loop 2. Thus, as AND's 14 and 22 continue to alternate as before, the non-shaded set of data bits is transferred back to loop 1 and the shaded set of bits is transferred back to loop 2, thus restablishing the mode of operation heretofore referred to as normal operation in connection with FIG. 3.

Again, as previously pointed out, it is important to note that the sequence of occurrence of the data bits regenerated back onto the relay line by driver circuit 20 is undisturbed and remains, as it was previously, non-shaded before shaded.

In the shift left operation the bit timing pulses T1, T2, T4, T8, TS1 and TS2 are again shifted so that they remain synchronized with the output of LL1. As shown in FIG. 5, the shift left operation causes the TS1 signal to be shortened by half a B cycle whereby the following TS2 signal and all bit timing signals thereafter occur half a B cycle earlier in time to remain in phase with LL1.

While the above described embodiment has only two feedback loops, it may be readily appreciated that a system having any number of feedback loops may be constructed in accordance with the principles of the invention. For example, a three-loop system would require that data bits be multiplexed by thirds through the delay line and that any given data exchange operation simply be an interchange of data between the processing loop and the loop being called on. By performing this exchange, as in the above described embodiment, through a shifting of the time-reference signal at an instant when no substantive data bits are in the feedback loops, the same data sequence is constantly maintained in the delay line and all the above-described advantages appertaining to that condition are obtained. Of course, in systems having three or more feedback loops, the timing generator must supply the necessary timing control pulses based upon the number of loops in the system. This would necessarily require altering the timing and control circuit from that shown and described above. Also, in any system in accordance with the invention, the delay line should be chosen so that there is an equal number of bit positions on the line for each feedback loop.

While the invention has been particularly shown and described with reference to a preferred embodiment thereof, it will be understood by those skilled in the art that the foregoing and other changes in form and details may be made therein without departing from the spirit and scope of the invention.

I claim:

1. A recirculating data storage system comprising:

serial data storage means having an input terminal and an output terminal;

a first data feedback loop connected between said input and output terminals;

a second data feedback loop connected between the same said input and output terminals, said first data feedback loop including data-processing logic circuits for performing arithmetic operations on data fed thereto and said second data feedback loop being exclusive of said logic circuits;

a timing generator generating a constant-frequency timing signal having a frequency proportional to the passage of data through said serial data storage means;

gating means under the control of said timing generator for sequentially directing a first set of data units presented to said output terminal into said first loop and for directing a second set of data units regularly interspersed among said first set of units into said second loop; and selectively operable control means including a control device on which the signal level is changed for selectively reversing the operation of said gating means whereby said first set of data units is directed into said second loop and said second set of data units is directed into said first loop.

2. The recirculating data storage system as set forth in claim 1 wherein said gating means is comprised to direct every other data unit presented to said output terminal into said first loop and to direct the remaining units into said second loop.

3. The recirculating data storage system as set forth in claim 1 wherein said timing generator generates said timing signal to have positive and negative portions and said gating means comprises a first coincidence gate connected to said output terminal and energized in response to positive portions of said timing signal for directing said first set of data units and a second coincidence gate connected to said output terminal and energized in response to negative portions of said timing signal for directing said second set of data units.

4. The recirculating data storage system as set forth in claim 3 wherein said selectively operable control means comprises means for selectively inhibiting the operation of said timing generator for one-half of a cycle of operation thereof whereby the sequence of occurrence of said positive and negative portions of said signal is reversed.

5. A recirculating data storage system comprising:

serial data storage means having an input and an output;

first and second data feedback loops connecting said input and output;

gating means for sequentially directing a first set of data units presented to said output into said first loop and for directing a second set of data units, interspersed among said first set, into said second loop;

control means for selectively reversing the operation of said gating means whereby said first set of data units is directed into said second loop and said second set of data units is directed into said first loop;

said gating means comprising a timing generator generating a constant frequency timing signal;

a first coincidence gate connected to said output and energized in response to positive portions of said timing signal for detecting said first set of data units;

a second coincidence gate connected to said output and energized in response to negative portions of said timing signal for detecting said second set of data units;

said control means comprising means for selectively inhibiting the operation of said timing generator for one-half of a cycle of operation thereof whereby the sequence of occurrence of said positive and negative portions of said signal is reversed; and data input and processing means connected in said first feedback loop for operating on and changing the data units in said system, said timing generator further comprising means for generating signals for identifying the data units circulating in said first loop and means for supplying said identification signals to said data input and processing means.

References Cited

UNITED STATES PATENTS

| | | | |
|---|---|---|---|
| 3,107,344 | 10/1963 | Baker et al. | 340—173 |
| 3,156,896 | 11/1964 | Martin et al. | 340—167 |
| 3,278,904 | 10/1966 | Lekven | 340—172.5 |
| 3,309,671 | 3/1967 | Lekven | 340—172.5 |
| 3,414,883 | 12/1968 | Hildebrand | 340—172.5 |

OTHER REFERENCES

Retiming of Delay Lines, A. X. Widmer, IBM Technical Disclosure Bulletin, vol. 6, No. 11, April 1964, pp. 17, 18.

PAUL J. HENSON, Primary Examiner

R. F. CHAPURAN, Assistant Examiner